United States Patent [19]

Pipitone

[11] 4,154,989
[45] May 15, 1979

[54] CALL-SIGNAL RECEIVER FOR STATION OF TELECOMMUNICATION SYSTEM

[75] Inventor: Roberto Pipitone, Milan, Italy

[73] Assignee: Societa Italiana Telecomunicazioni Siemens S.p.A., Milan, Italy

[21] Appl. No.: 871,484

[22] Filed: Jan. 23, 1978

[30] Foreign Application Priority Data

Jan. 24, 1977 [IT] Italy .................................. 19557 A/77

[51] Int. Cl.² ............................................ H04M 3/02
[52] U.S. Cl. .................................................. 179/84 R
[58] Field of Search ............... 179/84 R, 84 T, 84 VF

[56] References Cited

U.S. PATENT DOCUMENTS

| | | | |
|---|---|---|---|
| 3,808,379 | 4/1974 | Lind | 179/84 T |
| 4,042,786 | 8/1977 | Freimanis | 179/84 R |

*Primary Examiner*—William C. Cooper
*Attorney, Agent, or Firm*—Karl F. Ross

[57] ABSTRACT

A receiver for call signals, designed to actuate an electro-acoustic transducer such as a ringer in response to incoming alternating voltages of low amplitude and relatively high frequency (e.g. 400 to 450 Hz) or high amplitude and relatively low frequency (e.g. 20 to 50 Hz), includes a detector for the high-frequency signal and an integrating threshold circuit for the low-frequency signal connected in parallel across a transmission line. The detector is preceded by a phase-locking circuit including a local oscillator of variable frequency adapted to latch on to the high-frequency signal. The presence of either type of call signal activates, through the detector or the threshold circuit, a binary pulse counter stepped by the squared output of the local oscillator to generate a low-frequency square wave subharmonically related to the oscillator frequency which periodically unblocks a gate circuit for the passage of the oscillator output to operate the transducer.

10 Claims, 4 Drawing Figures

CALL-SIGNAL RECEIVER FOR STATION OF TELECOMMUNICATION SYSTEM

FIELD OF THE INVENTION

My present invention relates to a receiver designed to actuate an electro-acoustic transducer, such as a conventional ringer, in a station of a telecommunication system, more particularly at a subscriber's telephone apparatus.

BACKGROUND OF THE INVENTION

Conventional call signals transmitted over a subscriber line of a telephone system consist of intermittent oscillations with a frequency below the usual voice band, generally of 20–50 Hz, which actuate an electromagnetic relay. An alternating current capable of energizing such a relay must be of considerable amplitude, resulting in appreciable energy losses along the line.

Recent developments in the telecommunication art have led to the gradual replacement of such electromagnetic ringers by electronic transducers responsive to low-voltage voice-frequency signals, such as encapsulated sound generators or miniature loudspeakers excited by crystal-controlled oscillators. Transducers of this type have an efficiency greatly superior to that of conventional electromechanical devices; they can be energized from an associated central office or exchange by the flow of a small direct current, generally of less than 1 mA, insufficient to initiate the establishment of an operating connection between the central office and the subscriber station.

Thus, a transducer of this type may be actuated by a call signal of a few hundred mV in a range of voice frequencies, e.g. between 300 and 3400 Hz, also used for signaling the free or engaged state of a line. At the central office, therefore, a common oscillator may be used for generating dial-tone or busy signals, transmitted to a subscriber station in its active state, and a call signal transmitted to an idle subscriber station. Such an arrangement also entails a considerable simplification of the subscriber's circuitry.

A changeover from the conventional electromagnetic ringing system to the electronic one necessitates an at least temporary coexistence of the two systems so that a subscriber station may receive call signals of either type. The problem arises, therefore, of providing such a station with a receiver responsive to both low-power call signals of relatively high frequency and high-power call signals of relatively low frequency.

OBJECT OF THE INVENTION

The general object of my present invention is to provide an improved receiver for low-power call signals, especially in a voice-frequency range.

A related object is to provide a receiver of this character which is highly selective to signals of a predetermined calling frequency, preferably of about 400 to 450 Hz, yet responsive to a wide range of amplitude variations in view of the significant attenuation of such signals by the distributed line capacitance.

A more particular object is to provide a receiver adapted to handle, without modification or reajustment, both types of call signals referred to above.

A further object of my invention is to provide means in such a manner for delaying its response for a short period, preferably not longer than 0.1 second, to make it insensitive to transients and other spurious signals without unduly retarding its operation.

Yet another object is to provide a receiver of high input impedance for voice-frequency signals to minimize its shunting effect upon the equipment of other systems connected in parallel therewith.

A still further object is to provide a receiver whose current consumption in its idle state is low, preferably of about 0.1–0.2 mA.

Yet a further object is to provide a receiver of the type set forth which is realizable by integrated circuitry of C-MOS type, allowing for inexpensive mass-production.

SUMMARY OF THE INVENTION

The foregoing objects are realized, in accordance with my present invention, by the provision of a call-signal receiver comprising a local oscillator which generates a continuous pulse train of a predetermined cadence, in a voice-frequency range, and feeds it to a normally inactive step-down circuit for conversion into a square wave of a lower frequency. The step-down circuit, which is advantageously designed as a binary pulse counter, receives an activating signal from monitoring circuitry responsive to an incoming call signal. A coincidence circuit such as an AND gate, connected to the local oscillator and to the step-down circuit, passes the generated pulse train in the presence of the activating signal during alternate half-cycles of the lower-frequency square wave whereby the incoming call signal is converted into an intermittent pulse sequence whose cadence corresponds to that of the oscillator output and which actuates an electro-acoustic transducer to generate an audible signal.

Pursuant to a more particular feature of my invention, the monitoring circuitry comprises a detector for a call signal of a voice frequency related (e.g. subharmonically) to the operating frequency of the oscillator, the detector having inputs connected to the oscillator and to the line carrying the incoming call signal.

In principle, such a frequency-selective detector could be a digital filter of the type including a counter for the half-cycles of the incoming call signal to which passage is given only if the count accumulated within a certain time interval falls between predetermined limits. Such a digital filter, however, requires a relatively extended counting period which for a signal frequency of about 400 Hz would be on the order of one second, thus involving a considerable delay in the audible reproduction of the call signal. I prefer, therefore, to provide the receiver with a phase-locking circuit which includes the local oscillator and develops an error signal in response to any phase deviations between the oscillator output and the incoming signal, the error signal resulting in the automatic readjustment of the oscillator frequency until the same falls into step with the signal. The detector may then be a simple logic network responding to the substantial disappearance of the error signal in the presence of a call signal.

To make the receiver compatible with a dual signaling system of the type discussed above, I prefer to design part of the monitoring circuitry as an integrating threshold circuit connected to the line in parallel with the frequency-selective detector, this threshold circuit having a time constant which is large compared with an operating cycle of the local oscillator so as to emit an activating signal for the step-down circuit in response to a call signal of predetermined minimum amplitude and of a frequency substantially lower than the oscillator frequency. The activating signal produced either by the detector or by the threshold circuit reaches the step-down circuit through an OR gate.

BRIEF DESCRIPTION OF THE DRAWING

The above and other features of the invention will now be described in detail with reference to the accompanying drawing in which.

SPECIFIC DESCRIPTION

Figure 1:
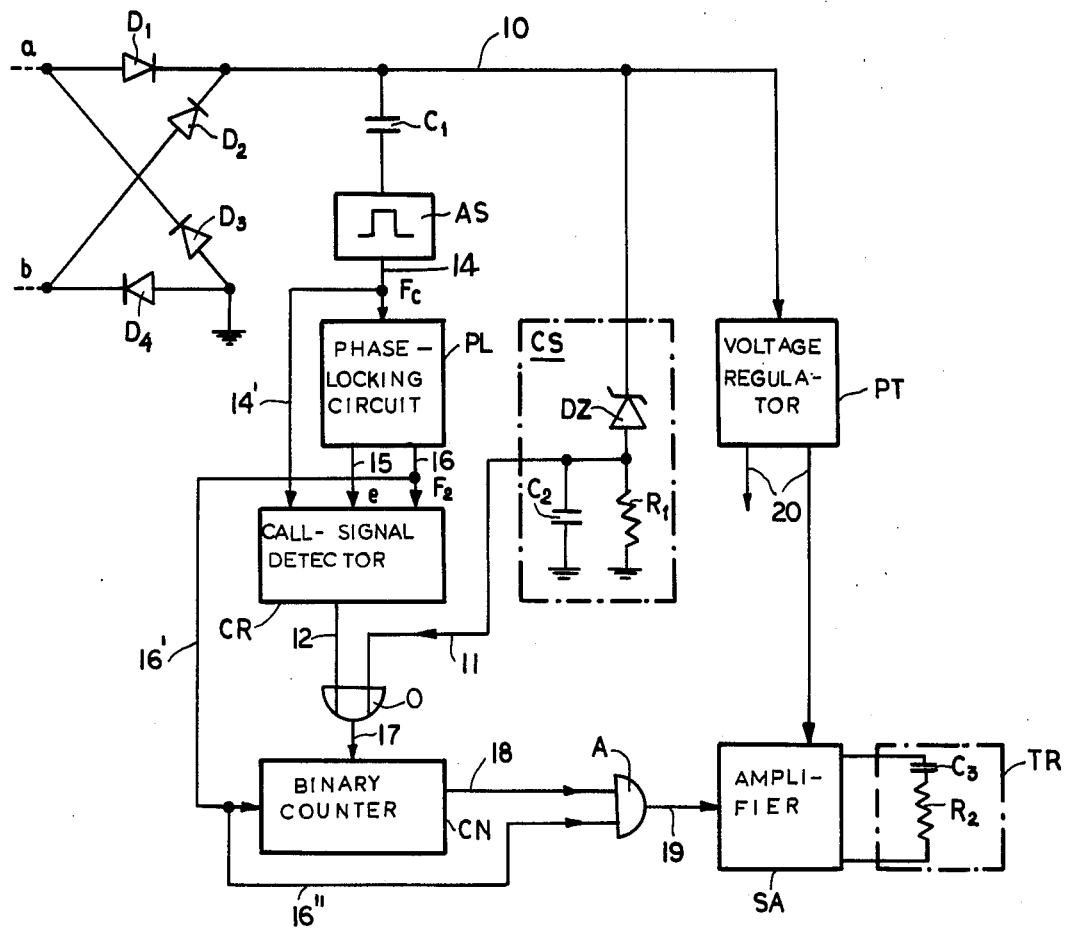
FIG. 1 is a block diagram of a call-signal receiver embodying my invention.

In FIG. 1 I have shown a transmission line, originating at a remote central office or exchange, with two wires a and circuit consisting of four diodes $D_1$–$D_4$. An incoming alternating voltage, which may be a high-amplitude call signal of the usual frequency of 20 to 50 Hz or a low-amplitude call signal in the voice-frequency band, is therefore converted into a pulsating current fed in parallel to a capacitor $C_1$, to a threshold circuit CS and to a voltage regulator RT; the latter, continuously energized from the central office via wire a with a low d-c voltage, supplies operating energy to all the components of the receiver via a set of output leads 20.

Capacitor $C_1$, which blocks the direct current from the central-office battery, is connected through a limiting amplifier or squarer AS to a phase-locking circuit PL and, in parallel therewith, to a call-signal detector CR. Threshold circuit SC comprises a Zener diode DZ in series with an integrating network consisting of a resistor $R_1$ shunted by a capacitor $C_2$; this network has a time constant large enough to convert a low-frequency call signal (e.g. of 25 Hz), of sufficient amplitude to traverse the Zener diode DZ, into a voltage of logical value "1" on a lead 11 extending to an OR gate O whose other input is tied to an input lead 12 of detector CR. Capacitor $C_1$ has a high impedance for low-frequency call signals detected by circuit CS.

Figure 2:
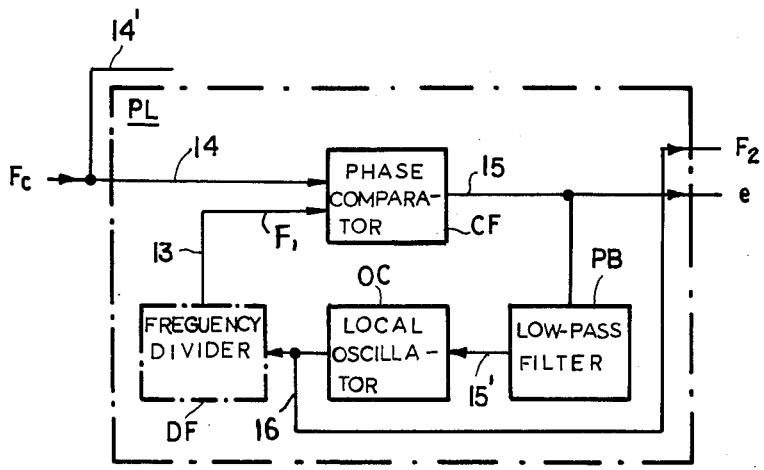
FIG. 2 is a more detailed diagram of a phase-locking circuit included in he receiver of FIG. 1.

Phase-locking circuit PL, more fully illustrated in FIG. 2, comprises a local oscillator OC which generates a pulse train of a cadence $F_1$ on a lead 13 connected to the oscillator output either directly or through a frequency divider DF. Thus, cadence $F_1$ corresponds either to the operating frequency $F_2$ of the oscillator or to a submultiple thereof. Lead 13 terminates at an input of a phase comparator CF also receiving, on an output lead 14 of squarer AS, an incoming call signal of frequency $F_c$ assumed to differ but slightly from frequency $F_1$. An error signal e on an output lead 15 of comparator CF is fed, via a low-pass filter PB and a branch lead 15', to a control input of oscillator OC to adjust its frequency in a manner tending to reduce that error signal to substantially zero. The virtual disappearance of signal e, therefore, is an indication that circuit PL has latched on to the incoming call signal, i.e. that the pulse train on lead 13 is in step with that signal.

Figure 3:
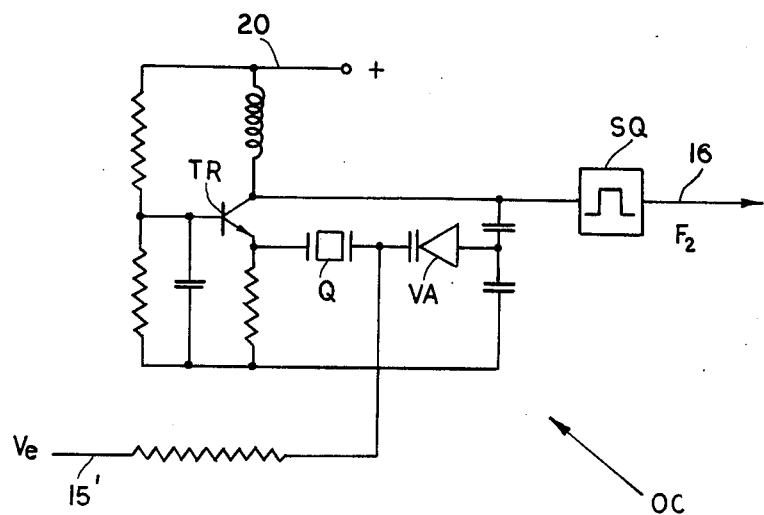
FIG. 3 is a circuit diagram of an adjustable oscillator forming part of the phase-locking circuit of FIG. 2.

As illustrated in FIG. 3, oscillator OC may comprise a transistor TR with a Colpitts-type feedback connection and a quartz crystal Q in series with a varactor VA in its tank circuit, the varactor constituting a supplemental capacitance varying with an applied error voltage $V_e$ on lead 15'. A squarer SQ in the oscillator output converts the generated sinusoidal oscillator into a square wave of frequency $F_2$ on an output lead 16. This square wave, or pulse train, has been illustrated in the top graph of FIG. 4. Signal e emitted by comparator CF is a series of pulses whose width is proportional to the phase difference between the two square waves on leads 13 and 14 (FIG. 2); filter PB integrates this pulse series to produce the corrective voltage $V_e$.

Detector CR receives signal frequency $F_c$ on a branch 14' of lead 14, error signal e on lead 15 and oscillator frequency F on lead 16 to energize its own output lead 12 whenever, with signals present on leads 14 and 16, the voltage on lead 15 drops below a predetermined limit, thus indicating the synchronization of oscillator OC with the incoming signal. OR gate O works through a lead 17 into an enabling input of a binary pulse counter CN with a stepping input connected to a branch 16' of lead 16 carrying the pulse train of cadence $F_2$. Branch 16' has an extension 16" terminating at one input of an AND gate A whose other input is tied to a lead 18 from the final stage of counter CN. With n stages, lead 18 is energized after $2^n$ pulses following activation of the counter by voltage on lead 17 (the absence of such voltage resulting in a resetting of the counter to zero) and remains in that condition for another $2^n$ pulses, as illustrated in the second and third graphs of FIG. 4. Thus, gate A is alternately blocked and unblocked to pass successive sequences of $2^n$ pulses of cadence $F_2$, separated by pauses of $2^n$ cycles, on an output lead 19 as illustrated in the correspondingly labeled fourth graph of FIG. 4.

This intermittent pulse train, occurring in the presence of a call signal of frequency $F_c$ or of a lower-frequency call signal reaching the intergrating network $R_1$, $C_2$, is fed through an amplifier SA to an electro-acoustic transducer TR here shown schematically as comprising a resistor $R_2$ in series with a capacitor $C_3$. Capacitor $C_3$ may represent a piezoelectric crystal of a sound generator, in which case resistor $R_2$ constitutes a protective resistance for such crystal. Alternatively, the resistor may be considered the low-ohmic resistance of an inductance coil in which case the capacitor $C_3$ has a current-limiting function.

The number n of stages of counter CN is preferably equal to 3 to 4. With $F_2=F_1=425$ Hz, for example, which is a conventional busy-signal frequency, lead 18 will be energized with a delay of 19 msec for n=3 (as shown in FIG. 4) and 38 msec for n=4 from a time $t_o$ marking the appearance of an activating signal on lead 17; such a delay, well below 100 msec, is sufficient to make the receiver nonresponsive to spurious signal voltages but does not significantly retard its operation.

Figure 4:
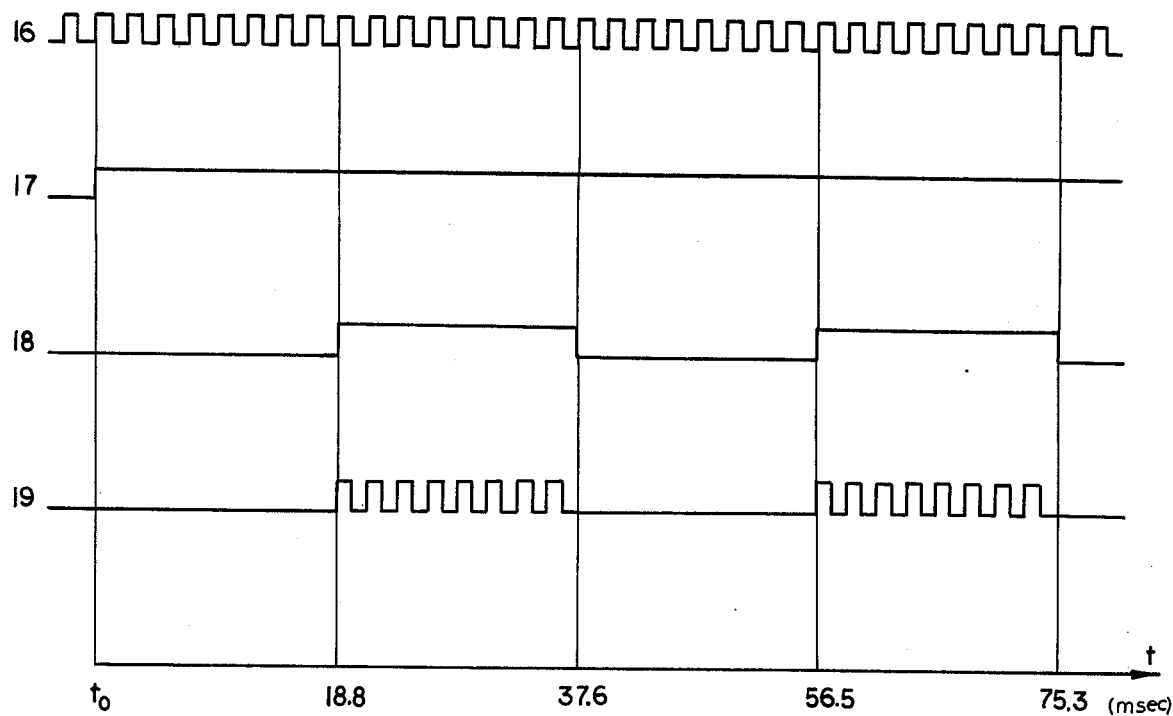
FIG. 4 is a set of graphs relating to the operation of the receiver.

Thus, counter CN in combination with AND gate A has the triple function of normally preventing conduction of amplifier SA, slightly delayng such conduction upon the appearance of a call signal, and modulating the pulse train delivered to that amplifier in the presence of such call signal at a frequency low enough to drive an electromechanical ringer, namely 425÷16=26.6 Hz in the instance depicted in FIG. 4. With a frequency divider DF (FIG. 2) of step-down ratio 2:1, pulse cadence $F_2$ will be twice the signal frequency $F_c$, i.e. 850 Hz under the assumed conditions.

The disclosed receiver can be conveniently realized in integrated circuitry, with an input impedance of several tens of kiloohms for voice-frequency signals. In view of its low energy consumption, the continuous operation of oscillator OC does not create any significant problem.

I claim:

1. A receiver for a call signal arriving over a transmission line of a telecommunication system, comprising:
   a local oscillator generating a continuous pulse train of predetermined cadence in a range of voice frequencies;
   normally inactive step-down means connected to said oscillator for converting said pulse train into a square wave of lower frequency;
   monitoring means selectively responsive to said call signal connected to said line for applying an activating signal to said step-down means in the presence of an incoming call signal;
   coincidence means connected to said oscillator and to said step-down means for passing said pulse train in the presence of said activating signal during alternate half-cycles of said square wave, thereby converting the incoming call signal into an intermittent pulse sequence of said cadence; and
   electro-acoustic transducer means connected to said coincidence means for generating an audible signal in response to said intermittent pulse sequence.

2. A receiver as defined in claim 1 wherein said monitoring means comprises a detector selectively responsive to a call signal of a predetermined voice frequency related to the operating frequency of said oscillator, said detector being provided with input connections extending from said line and from said oscillator.

3. A receiver as defined in claim 2 wherein said oscillator means is part of a phase-locking circuit and is limitedly adjustable to fall into step with an incoming call signal in response to an error signal developed by said phase-locking circuit, said detector being triggered by a substantial disappearance of said error signal to emit said activating signal.

4. A receiver as defined in claim 3 wherein said phase-locking circuit comprises a phase comparator with first and second inputs respectively connected to said line and to said oscillator and with an output connection feeding back said error signal to said oscillator.

5. A receiver as defined in claim 4 wherein said phase-locking circuit further comprises a frequency divider inserted between said oscillator and said second input of said phase comparator.

6. A receiver as defined in claim 4, further comprising a limiting amplifier inserted between said line and said first input of said phase comparator.

7. A receiver as defined in claim 2 wherein said monitoring means further comprises an integrating threshold circuit connected to said line in parallel with said detector, said threshold circuit having a time constant which is large compared with an operating cycle of said oscillator for emitting said activating signal in response to a call signal of predetermined minumum amplitude and of a frequency substantially lower than said operating frequency, said detector and said threshold circuit being connected to said step-down means through an OR gate.

8. A receiver as defined in claim 7 wherein said threshold circuit comprises an R/C network in series with a Zener diode.

9. A receiver as defined in claim 1 wherein said step-down means comprises a binary pulse counter with a final stage connected to said coincidence means.

10. A receiver as defined in claim 1, further comprising full-wave raw-rectifying means in said line upstream of said monitoring means.

* * * * *